Nov. 11, 1924.

J. L. MITCHELL

COLOR HARMONY CHART

Filed Oct. 20, 1920

WITNESSES
Edw. Thorpe

INVENTOR
John L. Mitchell
BY Munn & Co.
ATTORNEYS

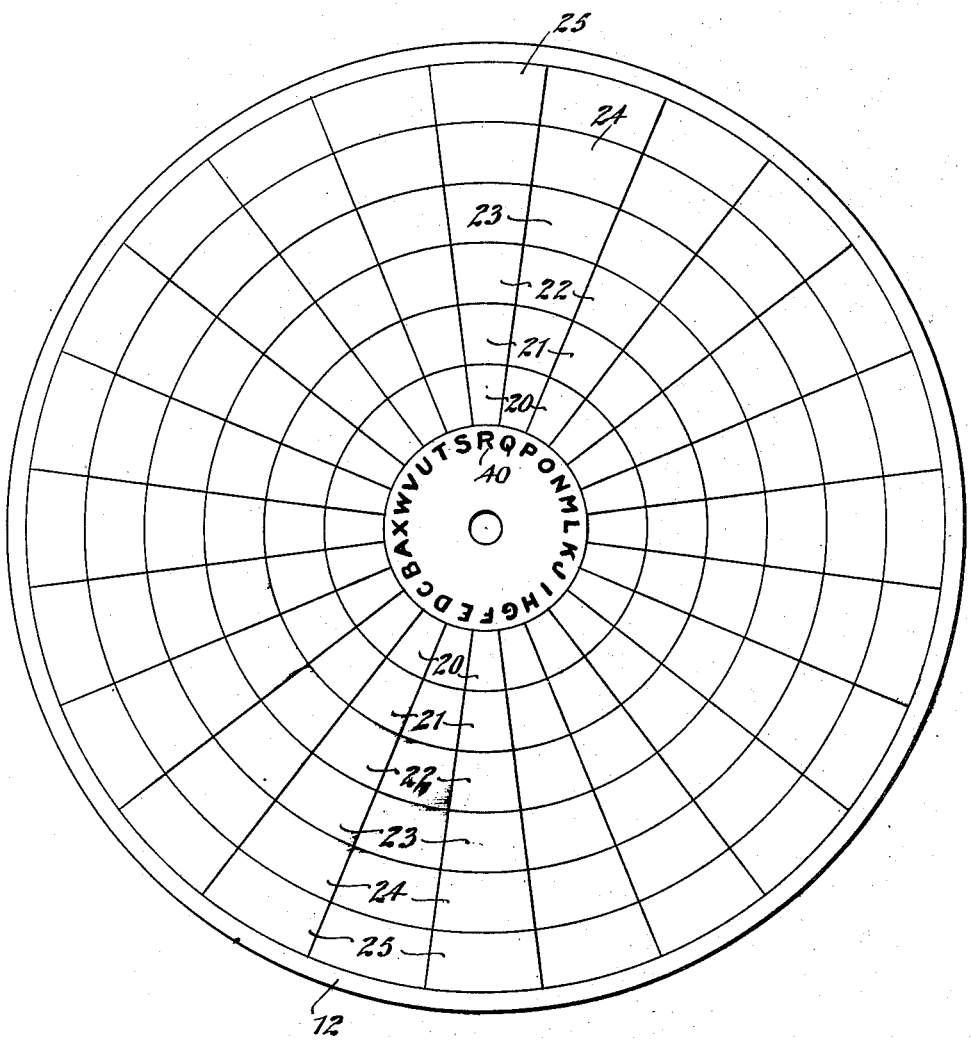

Patented Nov. 11, 1924.

1,515,512

UNITED STATES PATENT OFFICE.

JOHN L. MITCHELL, OF NEW YORK, N. Y.

COLOR-HARMONY CHART.

Application filed October 20, 1920. Serial No. 418,212.

*To all whom it may concern:*

Be it known that I, JOHN L. MITCHELL, a citizen of the United States, and a resident of the city of New York, borough of Manhattan, in the county and State of New York, have invented a new and Improved Color-Harmony Chart, of which the following is a full, clear, and exact description.

The object of the invention is to provide a new and improved color harmony chart for the use of dealers in paints, painters, interior decorators and other persons, and more especially designed to enable a person to obtain correct color harmonies for interior and exterior decorations of various kinds.

Another object is to display both analogous and complementary colors in a very simple and effective manner.

Another object is to enable a customer to readily select the desired colors for, say, decorating a house interior as to the colors of the walls, woodwork, carpets, rugs, furniture, draperies and hangings.

With these and other objects in view, the invention consists of certain novel features of construction as hereinafter shown and described and then specifically pointed out in the claims.

A practical embodiment of the invention is represented in the accompanying drawings forming a part of this specification in which similar characters of reference indicate corresponding parts in all the views.

Figure 3 is a plan view of the revoluble disk bearing the colors and one set of identification characters.

Figure 1:
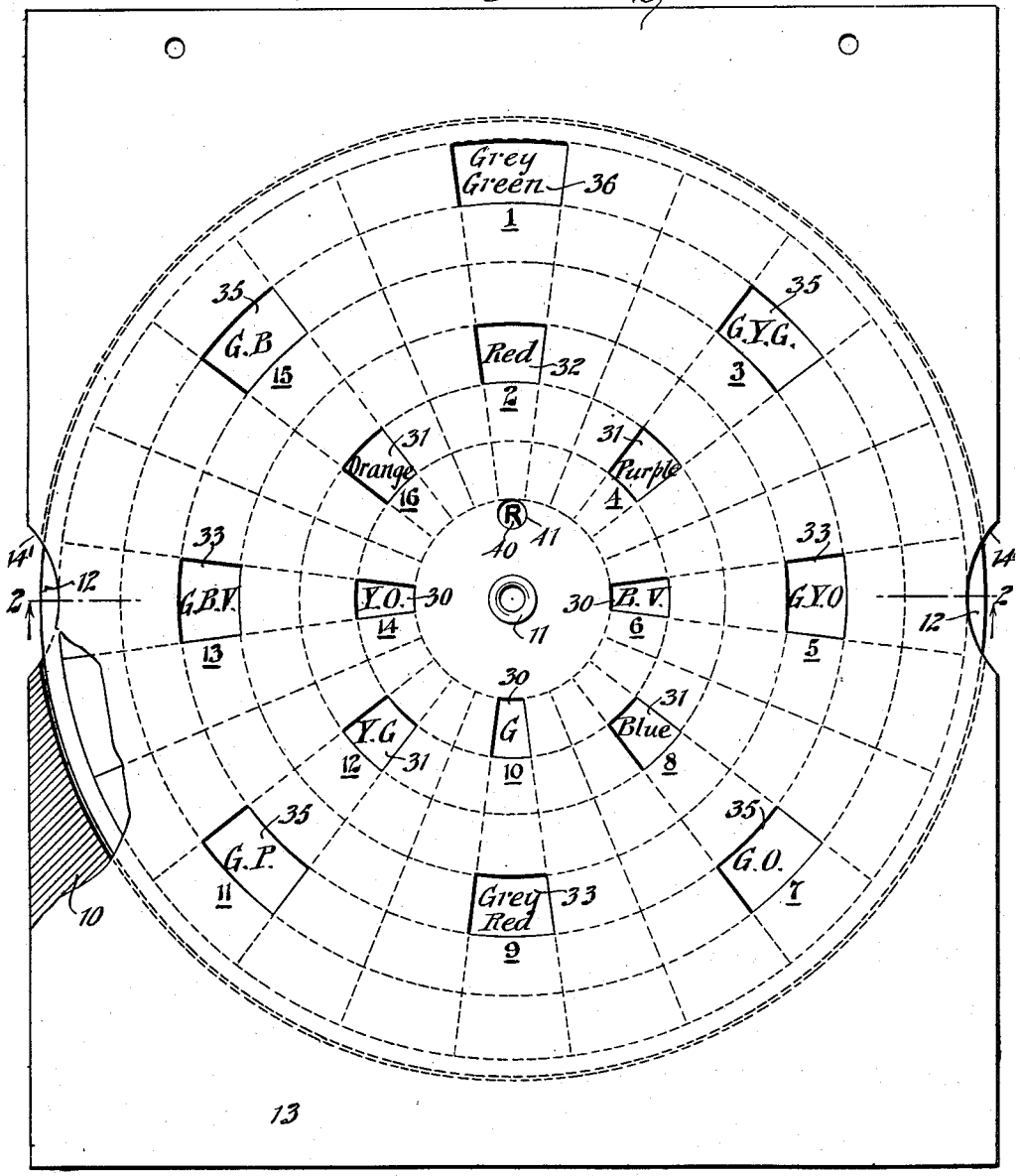
Figure 1 is a plan view of the color harmony chart, parts being shown broken out.
Figure 2:
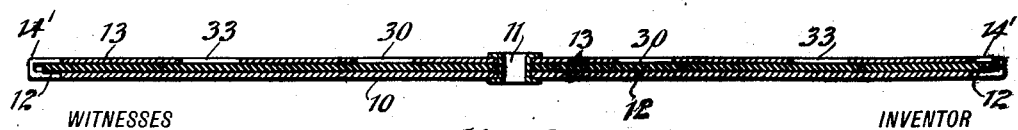
Figure 2 is a sectional side elevation of the same on the line 2—2 of Figure 1.

On a suitable base 10 is arranged centrally a pivot 11, on which is mounted to turn a disk 12, over which extends a cover 13 attached to the base 10. The base 10 and the cover 13 are provided at the sides with cut-out portions 14' into which project diametrically opposite portions of the peripheral edge of the disk 12 to permit the user of the chart to conveniently turn the said disk on the pivot 11. The disk 12 is provided on its face with a plurality of color areas 20, 21, 22, 23, 24 and 25 arranged concentrically to the pivot 11. The innermost color area 20 has applied thereto the primary and secondary colors and the next adjacent color areas 21 and 22 have applied thereto lighter tints of these said primary and secondary colors, the remaining color areas 23, 24 and 25 having applied thereto grayed or subdued tints and shades of these primary and secondary colors, the lightest tints being preferably on the outer circle. In the color area 20 there are twenty-four spaces and the different colors in these spaces starting at the top of the chart, as shown in Figure 1 of the drawings, and reading to the right, are, red, purple red, red purple,—purple, purple violet, violet,— blue violet, violet blue, blue blue violet,— blue, blue green, green blue,—green, green green yellow, green yellow, yellow green,— yellow, yellow yellow orange, yellow orange, orange yellow, orange orange yellow,—orange, red orange, and orange red.

In the spaces in the color area 21 are shown lighter tints of the colors in the color area 20, the lighter tint of each color being disposed radially relatively to the said color in the area 20. In the spaces in the color area 22 are shown the lightest tints of the colors in the color area 20, the lightest tint of each color in the area 22 being also disposed radially relatively to the said color in the area 20. The arrangement of red in the spaces radially in the area 20, 21 and 22 is therefore red in the area 20, lighter tint of red in the area 21 and lightest tint of red in the area 22 and the arrangement of purple is purple in the area 20, lighter tint of purple in the area 21, and lightest tint of purple in the area 22.

In the color area 23 there are shown grayed or subdued tints or shades of the colors in the color area 20 but the grayed or subdued tints in the color area 23 are not of the colors in the nearest radially disposed space in the area 20 but they are of the colors in the diametrically opposite space in the said area 20. In the spaces in the color area 24 are shown respectively lighter tints of the grayed or subdued tints in the radially disposed spaces in the area 23 and in the spaces in the color area 25 there are shown the lightest tints of the grayed or subdued tints in the spaces in the color area 23, the lightest tint of each grayed or subdued tint being disposed radially relatively to the said grayed or subdued tint in the area 23. Therefore, starting at the top of the chart, as shown in Fig. 1 of the drawings, and reading downwardly the colors will be, lightest tint of grayed green in area 25, lighter tint of grayed green in area 24 (that is lighter than the shade in area 23), grayed green in area 23, red, lightest tint in area 22, red, lighter tint in area 21, (that is lighter shade than in area 20) red in area 20. Then passing diametrically through the center of the chart and continuing to read downwardly green is shown in area 20, lighter tint of green is shown in area 21, and the lightest tint of green is shown in area 22; grayed red is shown in area 23, a lighter tint of grayed red is shown in area 24, and the lightest tint of grayed red is shown in area 25. The colors of the color area 20 are adapted to be displayed in three openings 30 formed in the cover 13, two of the openings being diametrically opposite each other and the third one being between and equidistant from the other two. The colors in the color area 21 are adapted to be displayed through four openings 31 formed in the cover and spaced equal distances apart. The openings 31 are staggered relative to the openings 30. The colors in the color area 22 are adapted to be displayed singly through a single opening 32 formed in the upper portion of the cover 13. The colors in the color area 23 are adapted to be displayed through three openings 33 formed in the cover 13 and in radial alinement with the opening 30. The colors in the color area 24 are adapted to be displayed through four openings 35 spaced equal distances apart and formed in the cover 13 in radial alinement with the openings 31. The colors in the outermost color area 25 are adapted to be singly displayed through a single opening 36 formed in the cover 13 at the top thereof and in radial alinement with the opening 32. The various openings in the cover 13 have associated therewith identification characters, preferably numerals, as plainly shown in Figure 1, and the openings marked 1, 2, 10, 9, the openings marked 3, 4, 12, 11, the openings marked 5, 6, 14, 13, and the openings marked 7, 8, 15, 16 are arranged in diametrical alinement with each other, as will be readily understood by reference to Figure 1. Thus the colors appearing through the diametrically arranged openings are complementary colors while the colors appearing in the openings circumferentially are analogous and may be used in conjunction with the complementary colors exhibited. It will be seen that the colors in the spaces in the color areas 20, 21 and 22 are complementary with reference to the colors in the diametrically opposite spaces in the areas 20, 21 and 22 and that the colors in the spaces in the areas 23, 24 and 25 are complementary with reference to the colors in the diametrically opposite spaces in the said areas 23, 24 and 25, and further the colors in the spaces in the areas 20, 21 and 22 are complementary with reference to the colors in the radially disposed spaces in the areas 23, 24 and 25. On the disk 12 adjacent the color area 20 are arranged indicating characters 40, preferably the letters of the alphabet arranged in a circle, the center of which coincides with the pivot 11. The indicating characters 40 are adapted to appear singly in an opening 41 formed in the cover 13 in diametrical alinement with the openings marked 1, 2, 10 and 9. The indicating characters 40 coact with the indicating characters at the openings through which appear the colors of the various color areas to form a guide for identifying the particular colors with a color card such as is usually published by the color producing concerns.

When the disk 12 is in the position shown in Figure 1, the identifying character "R" appears in the opening 41 and in this particular case the complementary colors are, for instance, red and green appearing in the openings marked 2 and 10, gray green and gray red appearing in the openings marked 1 and 9, purple and yellow green appearing in the openings marked 4 and 12, gray yellow green and gray purple appearing at the openings marked 3 and 11, blue and orange appearing at the openings marked 8 and 16, gray orange and gray blue appearing at the openings 7 and 15, blue violet and yellow orange appearing at the openings marked 6 and 14, and gray yellow orange and gray blue violet appearing at the opening 5 and 13. It is further understood that the complementary colors are not analogous colors, as the latter are colors relating one to the other, as, for instance, blue relates to green, green to yellow, yellow to orange, orange to red, red to violet, and violet to blue. It is understood that the remaining colors on the disk are similarly arranged and are correspondingly identified by the identifying character 40 whenever the latter appears in the opening 41. It will further be noticed that as shown at 24 different colors are in each of the color areas 20, 21, 22, 23, 24, and 25, and the colors in the several areas are so disposed relative to the corresponding openings 30, 31, 32, 33, 34, 35 and 36 as to permit of making a large number of combinations, disclosing complementary colors diametrically and analogous colors circumferentially. Thus the disk 12, divided as shown in Figure 3, displays 144 different colors.

From the foregoing it will be seen that a person can readily obtain more correct color harmonies by correspondingly turning the disk 12 to display the complementary colors at the several openings in the cover 13. The selected colors can be readily identified by the alphabetical identifying characters 40 on the disk 12, and the corresponding colors identified by the same letters or numerals in a color card such as published by a manufacturing concern. Thus the dealer is enabled to supply the desired complementary colors as selected by a customer, and the latter is not liable to make a mistake in the selection of such colors. It is understood that the user of the color harmony chart turns the disk 12 until the color, tint or shade of color desired is exposed at one of the openings, and then the colors, tints or shades of colors appearing diametrically from the selected color are complementary, while the remaining colors, tints or shades are analogous and can be used in conjunction with them.

As has been stated, primary and secondary colors are shown at 20, lighter tints of these colors are shown at 21 and 22, and grayed and subdued tints are shown at 23, 24 and 25, the lightest tints being adjacent the periphery. It will also be seen that by referring to the drawings that the smallest openings are adjacent the center of the cover and with the openings becoming larger in the direction of the periphery of the cover. This arrangement naturally discloses a greater surface of a grayed or light tint than in the case of a strong tint which is shown in one of the inner circles. As shown in the drawings the areas of the openings are substantially relatively proportional to the superficial area which the respective color should occupy in any general scheme of coloring.

Having thus described my invention, I claim as new and desire to secure by Letters Patent:—

1. A color harmony chart comprising a revoluble disk having color areas arranged concentrically, one of the said areas having applied thereto the colors of the spectrum and the next adjacent having applied thereto tints of the said spectrum colors and the remaining areas having applied thereto colors which are subdued tints and shades of the said spectrum colors, the said disk having applied thereto indicating characters arranged in a circle concentric with the said areas, and a cover overlying the said disk and having openings in register with the said areas, the said openings being arranged to display complementary colors at the openings arranged diametrically and analogous colors at the openings arranged concentrically, the said cover having an opening in register with the said indicating characters to singly display one of the said indicating characters at a time, and the said cover having indicating characters one for each of the said openings through which the color areas are displayed, the said indicating characters on the disk and cover coacting to form a guide for identifying the corresponding color.

2. A color harmony chart comprising a revoluble disk having color areas arranged concentrically, one of said areas having applied thereto the colors of the spectrum, certain of the next adjacent areas having applied thereto tints of said spectrum colors, and the remaining areas having applied thereto colors which are subdued tints and shades of the said spectrum colors, and a cover overlying the said disk and having openings in register with the corresponding areas, the openings being arranged to display complementary colors at openings arranged diametrically and analogous colors at openings arranged concentrically, the areas of said openings being substantially relatively proportional to the superficial area which the respective color should occupy in any general scheme of coloring.

3. A color harmony chart which includes a disk having color areas thereon, a cover for said disk having openings therein and exposing therethrough certain of said color areas, preferably such colors as are designed to form a general color scheme, the areas of the openings in the cover being substantially relatively proportional to the superficial area which the respective colors should occupy in any general scheme of coloring.

4. A color harmony chart comprising a disk having color areas arranged adjacent each other, one of the color areas having applied thereto the colors of the spectrum, an adjacent color area having applied thereto tints of said spectrum colors, and a cover overlying the disk and having openings in register with said areas, the openings being arranged to display complementary colors in one direction and in another direction analogous colors which may be used in conjunction with the said complementary colors, the areas of said openings being substantially relatively proportional to the superficial area which the respective color should occupy in any general scheme of coloring.

5. A color chart comprising a disk having color areas arranged adjacent each other, one of the color areas having applied thereto the colors of the spectrum, an adjacent color area having applied thereto tints of said spectrum colors, the said disk having applied thereto indicating characters, and a cover overlying the said disk and having openings in register with the said areas, the openings being arranged to display complementary colors in one direction and in another direction analogous colors which may be used in conjunction with the said complementary colors, the said cover having an opening in register with the said indicating characters to singly display one of said indicating characters at a time, and the said cover having indicating characters one for each of the said openings, through which the color areas are displayed, the said indicating characters on the disk and cover coacting to form a guide for identifying the corresponding color.

6. A color harmony chart comprising a disc having a color area arranged around a pivot and having applied thereto colors of the spectrum with complementary colors arranged diametrically, adjacent color areas arranged concentrically and having applied thereto tints of said spectrum colors and arranged radially relatively to the said spectrum colors respectively, color areas arranged concentrically adjacent the first mentioned color areas and having applied thereto colors which are subdued tints of the diametrically applied colors respectively in the first mentioned area and a cover over-lying the said disc and having a plurality of pairs of openings each pair of openings being disposed radially for registry with the said areas.

7. A color harmony chart comprising a disc having a color area arranged around a center and having applied thereto colors of the spectrum with complementary colors arranged diametrically, adjacent color areas arranged concentrically and having applied thereto tints of said spectrum colors and arranged radially relatively to the said spectrum colors respectively, color areas arranged concentrically adjacent the first mentioned color areas and having applied thereto colors which are subdued tints of the diametrical applied colors respectively in the first mentioned area and a cover over-lying the said disc and having a plurality of pairs of openings, each pair of openings being disposed radially, one opening of each pair for registry with one of the third mentioned color areas and the other opening of each pair for registry with one of the other color areas.

8. A color harmony chart comprising a disc having a color area arranged around a pivot and having applied thereto colors of the spectrum with complementary colors arranged diametrically, adjacent color areas arranged concentrically and having applied thereto tints of said spectrum colors and arranged radially relatively to the said spectrum colors respectively, color areas arranged concentrically adjacent the first mentioned color areas and having applied thereto colors which are subdued tints of the diametrically applied colors respectively in the first mentioned area and a cover over-lying the said disc and having a plurality of pairs of openings each pair of openings being disposed radially for registry with the said areas, each pair of radially disposed openings being positioned diametrically with reference to another pair of the radially disposed openings.

9. A color harmony chart comprising a revolvable disc having color areas arranged concentrically, one of the said areas having applied thereto the colors of the spectrum an adjacent area having applied thereto tints of the said spectrum colors and the remaining areas having applied thereto colors which are subdued tints and shades of the spectrum colors and a cover over-lying the said disc and having pairs of openings in registry with the said areas, each pair of openings being disposed radially and being arranged diametrically with reference to another pair of openings.

10. A color harmony chart comprising a revolvable disc having color areas arranged concentrically, the said disc having applied thereto indicating characters arranged in a circle concentrically with the said areas and a cover over-lying the said disc and having openings in registry with the said areas, the said cover having an opening in registry with the said indicating characters to display one of the said indicating characters at a time and the said cover having indicating characters one for each of the said openings through which the color areas are displayed, the said indicating characters on the disc and cover co-acting to form a guide for identifying the corresponding color.

JOHN L. MITCHELL.